(12) United States Patent
Diggle et al.

(10) Patent No.: US 7,073,761 B2
(45) Date of Patent: Jul. 11, 2006

(54) COMMUNICATION CABLE SUPPORT

(75) Inventors: Frederick Diggle, Birmingham, AL (US); Shane Towles, Birmingham, AL (US)

(73) Assignee: Bellsouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 10/759,996

(22) Filed: Jan. 16, 2004

(65) Prior Publication Data

US 2005/0156089 A1    Jul. 21, 2005

(51) Int. Cl.
*F16B 45/00* (2006.01)
*F16L 3/00* (2006.01)

(52) U.S. Cl. .................. 248/304; 248/58; 248/317
(58) Field of Classification Search ............... 248/317, 248/690, 692, 58, 61, 304, 339
See application file for complete search history.

(56) References Cited

U.S. PATENT DOCUMENTS

| | | | |
|---|---|---|---|
| 382,171 A | 5/1888 | Lutz | |
| 507,743 A | 10/1893 | MacTaggart | |
| 528,319 A | 10/1894 | Beaton | |
| 852,285 A * | 4/1907 | Murray | 294/90 |
| 927,483 A * | 7/1909 | Bradley | 248/303 |
| 1,447,636 A * | 3/1923 | White | 248/301 |
| 1,721,338 A * | 7/1929 | Gagnon | 16/87.8 |
| 2,005,334 A * | 6/1935 | Casper | 248/328 |
| 2,630,610 A * | 3/1953 | Lock | 24/116 R |
| 2,813,744 A * | 11/1957 | Hutchinson | 294/75 |
| 2,817,847 A * | 12/1957 | Spencer | 4/353 |
| 3,091,492 A * | 5/1963 | Young | 294/82.1 |
| 3,199,820 A * | 8/1965 | Thompson | 248/222.41 |
| 3,382,819 A * | 5/1968 | Davidson et al. | 108/23 |
| 3,729,926 A * | 5/1973 | Buske | 59/93 |
| 4,036,460 A | 7/1977 | Storck | |
| 4,273,371 A * | 6/1981 | Behnke et al. | 294/82.11 |
| 4,332,411 A * | 6/1982 | Ellzey | 294/104 |
| 4,446,818 A * | 5/1984 | Rigterink | 119/57.4 |
| 4,709,888 A | 12/1987 | Cubit | |
| 4,811,475 A * | 3/1989 | Morton, Jr. | 29/521 |
| 4,824,057 A * | 4/1989 | Suprono | 248/62 |
| 5,253,909 A * | 10/1993 | Oshita | 294/82.11 |
| 5,303,885 A | 4/1994 | Wade | |
| 5,740,994 A | 4/1998 | Laughlin | |
| 5,765,891 A * | 6/1998 | Fredriksson | 294/82.11 |
| 5,779,198 A * | 7/1998 | Rutherford et al. | 248/58 |
| 6,186,383 B1* | 2/2001 | Kobdish | 224/420 |
| 6,267,343 B1* | 7/2001 | Waisbrod et al. | 248/339 |
| 6,299,118 B1* | 10/2001 | Farrell | 248/327 |
| 6,302,365 B1* | 10/2001 | Catanzarite et al. | 248/339 |

(Continued)

FOREIGN PATENT DOCUMENTS

JP    11-94134    *  9/1999

*Primary Examiner*—Anita M. King
(74) *Attorney, Agent, or Firm*—Walters & Zimmerman; Geoff Sutcliffe; Jennifer Pearson Medlin

(57) ABSTRACT

An apparatus is disclosed for routing a communication cable within a crawlspace. The apparatus has a chain dangling from a means for supporting the apparatus. A generally hook-shaped saddle supports a communications cable thereacross. The saddle has a crown, a stem downwardly extending from the crown, and a generally semi-circular section outwardly extending from the stem and forming the saddle. The crown includes an open-ended slot for sliding onto a link of the chain. The crown can be positioned along the chain, thus varying the height of the saddle along the chain and helping maintain a desired routing of the communication cable.

17 Claims, 5 Drawing Sheets

U.S. PATENT DOCUMENTS 6,317,940 B1 * 11/2001 Matoba et al. ............. 24/600.9
6,332,594 B1    12/2001 Shelton
6,530,545 B1 *  3/2003 Deciry et al. ................. 248/49
6,565,048 B1    5/2003 Meyer

* cited by examiner

COMMUNICATION CABLE SUPPORT

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but the copyright owner otherwise reserves all copyrights whatsoever.

BACKGROUND OF THE INVENTION

1. Field of the Invention

This invention generally relates to supports and, more particularly, to adjustable supports for one or multiple communication cables.

2. Description of the Related Art

Communications cables must be supported for optimum signal propagation. Communications cables, such as telephone wires, telephone cables, CAT 3, 5, and 7 voice/data communications cables, and fiber optic cables, must be routed and supported according to the Building Telecommunications Wiring Standard ANSI/TIA/EIA-568A. If the communications cable is not appropriately routed and supported, the communications cable deforms. When the communications cable deforms, such as by sagging, by kinking, and by excessive bending, this deformation may damage the communications cable and may degrade the propagation of signals along the communications cable.

Deformation of communications cables is especially acute within crawlspaces. A crawlspace can be any space through which the communications cable is routed. The crawlspace might be spacing between floors, ceilings, and/or walls of a building. Even though communications cables are strung within the crawlspace, the routing of the communications cables is often disturbed during installation and/or maintenance of electrical wiring, plumbing, and HVAC ducting. When the routing of the communications cables is disturbed, signal propagation along the communications cable can degrade.

Another problem is labor-intensive hangers. When communications cables are strung within the crawlspace, hangers are used to support the communications cables. These prior art hangers are cumbersome, time-consuming, and, thus, labor-intensive. These prior art hangers include a threaded rod, an "L"-shaped bracket, and a "J"-shaped bracket. A hole is drilled in a supporting surface (such as a concrete wall, a wood/metal stud, drywall, or metal framing). An anchor is then hammered into the drilled hole, and the threaded rod is threaded into the anchor. The threaded rod hangs from the anchor, and a technician then cuts the threaded rod to a desired length. The "L"-shaped bracket is then threaded onto the rod. The "J"-shaped bracket is then attached to the "L"-shaped bracket with a threaded fastener. Only after this prior art hanger is assembled can the communications cables be supported within the "J"-shaped bracket. The technician wastes precious time assembling this cumbersome, multi-component prior art hanger.

There is, accordingly, a need for an apparatus that routes communication cables within a crawlspace, an apparatus that has a reduced assembly time, and an apparatus that is quicker and easier to install within the crawlspace.

BRIEF SUMMARY OF THE INVENTION

The aforementioned problems are reduced by an apparatus for routing a communication cable within a crawlspace. This invention allows a technician to quickly and to easily route and install communications cables within the crawlspace. The technician first determines the desired routing of the communication cable within the crawlspace. The technician then installs this invention within the crawlspace at one or more desired locations. The technician inserts the communications cable into and through this invention, and this invention helps maintain the desired routing of the communications cable. This invention also reduces deformation of the communications cable and maintains optimum signal propagation along the communications cable.

One embodiment of this invention describes an apparatus for routing a communication cable within a crawlspace. The apparatus has a chain dangling from a means for supporting the apparatus. A generally hook-shaped saddle supports a communications cable thereacross. The saddle has a crown, a stem downwardly extending from the crown, and a generally semi-circular section outwardly extending from the stem and forming the saddle. The crown includes an open-ended slot for sliding onto a link of the chain. The crown can be positioned along the chain, thus varying the height of the saddle along the chain and helping maintain a desired routing of the communication cable.

BRIEF DESCRIPTION OF THE SEVERAL VIEWS OF THE DRAWINGS

These and other features, aspects, and advantages of this invention are better understood when the following Detailed Description of the Invention is read with reference to the accompanying drawings, wherein.

DETAILED DESCRIPTION OF THE INVENTION

This invention now will be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

This invention allows a technician to quickly and to easily route communications cables within the crawlspace. Once the technician determines the desired routing of the communications cable within the crawlspace, this invention is installed at one or more desired locations. The technician inserts the communications cable into and through this invention, and this invention supports the communications cable and helps maintain the desired routing of the communications cable. Because this invention maintains the desired routing, this invention also reduces deformation of the communications cable. This invention also has adjustable features, so the invention can accommodate various routing options within the crawlspace. This invention thus allows easier and faster installation of communications cables, and this invention helps maintain propagation of signals along the communications cables.

Figure 1:
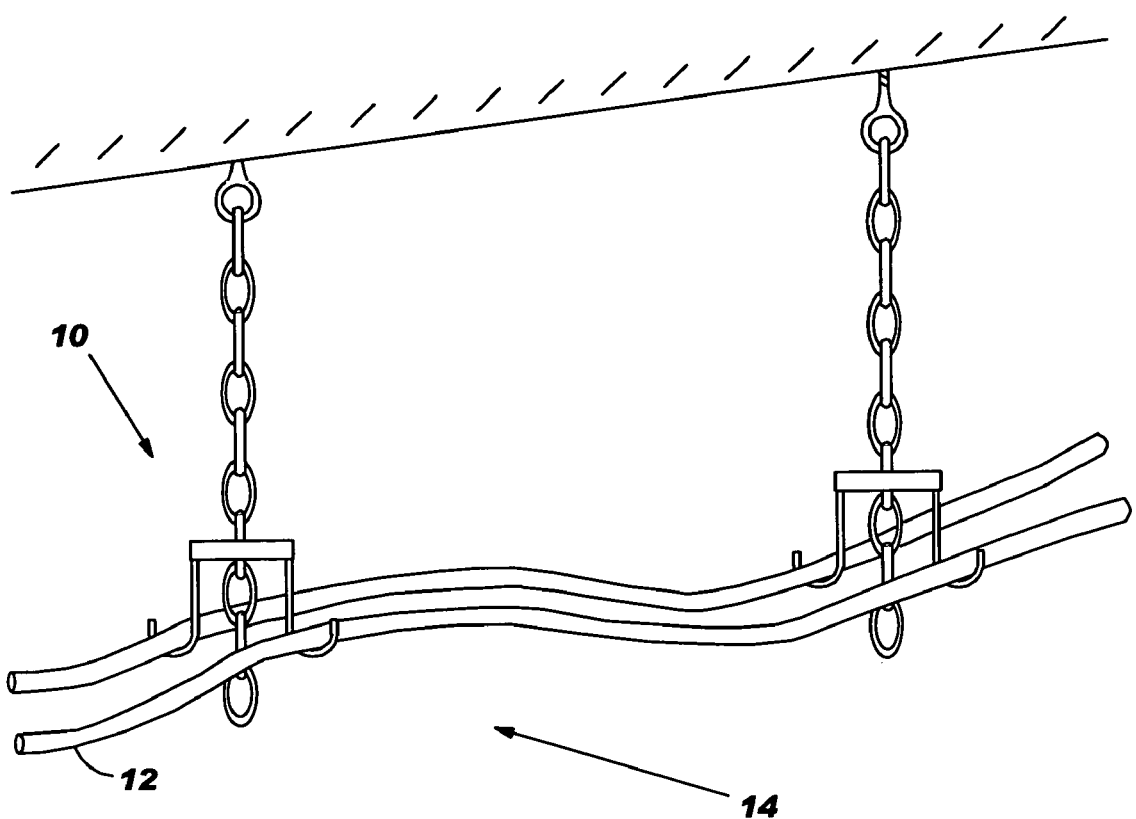
FIG. 1 is a schematic illustrating an operating environment for the embodiments of this invention.

FIG. 1 is a schematic illustrating an operating environment for this invention. FIG. 1 shows an apparatus 10 routing a communications cable 12 through a crawlspace 14. The crawlspace 14 can be any space through which the communications cable 12 is routed. The crawlspace 14, for example, might be spacing between a floor and a ceiling of a building, the spacing between the walls of a building, or the spacing under a building. The apparatus 10 helps reduce crimping and kinking as the communications cable 12 is routed through the crawlspace 14. The apparatus 10 also helps ensure any radius of curvature of the communications cable 12 meets the Building Telecommunications Wiring Standard ANSI/TIA/EIA-568A.

Figure 2:
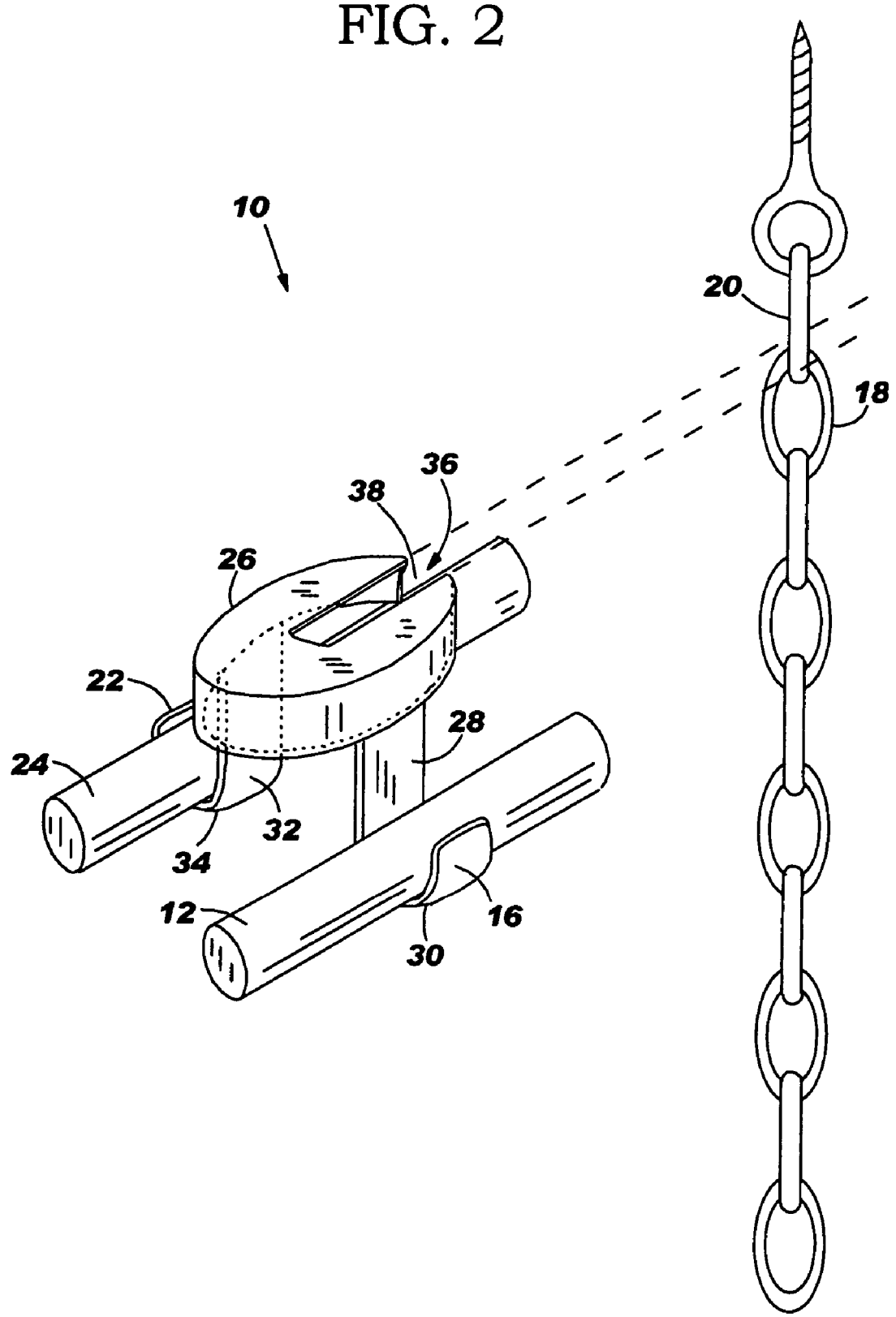
FIG. 2 is an exploded isometric view of the apparatus shown in FIG. 1, according to the embodiments of this invention.

FIG. 2 is an exploded isometric view of the apparatus 10 for routing the communications cable 12. The apparatus 10 has a generally hook-shaped saddle 16 that slides onto a link 18 of a chain 20. The chain 20 dangles from a means for supporting the apparatus 10. The communications cable 12 lays within and across the saddle 16. FIG. 2 also shows a second generally hook-shaped saddle 22 that also supports additional communications cables 24 routed through the crawlspace (shown as reference numeral 14 in FIG. 1). The saddles 16 and 22 downwardly extend from a crown 26. The first saddle 16 has a stem 28 downwardly extending from the crown 26. A generally semi-circular section 30 outwardly extends from the stem 28 and forms the first saddle 16. The second saddle 22, likewise, also includes a stem 32 downwardly extending from the crown 26. A generally semi-circular section 34 outwardly extends from the stem 32 and forms the second saddle 22. The crown 26 includes a slot 36 with an open end 38. The open end 38 of the slot 36 slides in between the adjoining links 18 and 38 of the chain 20. Because the crown 26 slides onto the chain 20, the crown 26 can be positioned at any link of the chain 20. The crown 26 thus varies the height of the saddles 16 and 22 along the chain 20 and help maintain a desired routing of the communications cables 12 and 24.

The apparatus 10 is an improvement over the prior art. Because this invention utilizes multiple saddles 16 and 22, the apparatus 10 can support more communications cables. The embodiments of this invention, in fact, support at least four times (4×) the communications cables as the prior art. The multiple saddles 16 and 22 are more desirable for office/business installations, where an office building might contain miles of communications cables routed within the crawlspace. Because the multiple saddles 16 and 22 provide greater capacity to support more communications cables, the apparatus 10 of this invention also provides expansion for future installations. As the field of communications continues to experience explosive growth, the need for secure, wired communications will experience similar growth. The greater capacity of this invention provides routing opportunities for this growth with less labor/installation costs.

The orientation of this invention also offers benefits. The multiple saddles 16 and 22 may have any orientation. Although the multiple saddles 16 and 22 may have any orientation, an opposing orientation offers still more benefits. If the multiple saddles 16 and 22 are aligned along opposite sides of the crown 26, the multiple saddles 16 and 22 "balance" the apparatus 10 on the chain 20. While the first and second saddles 16 and 22 are shown, even more saddles may be included. Each additional saddle provides still more capacity to support communications cables.

Figure 3:
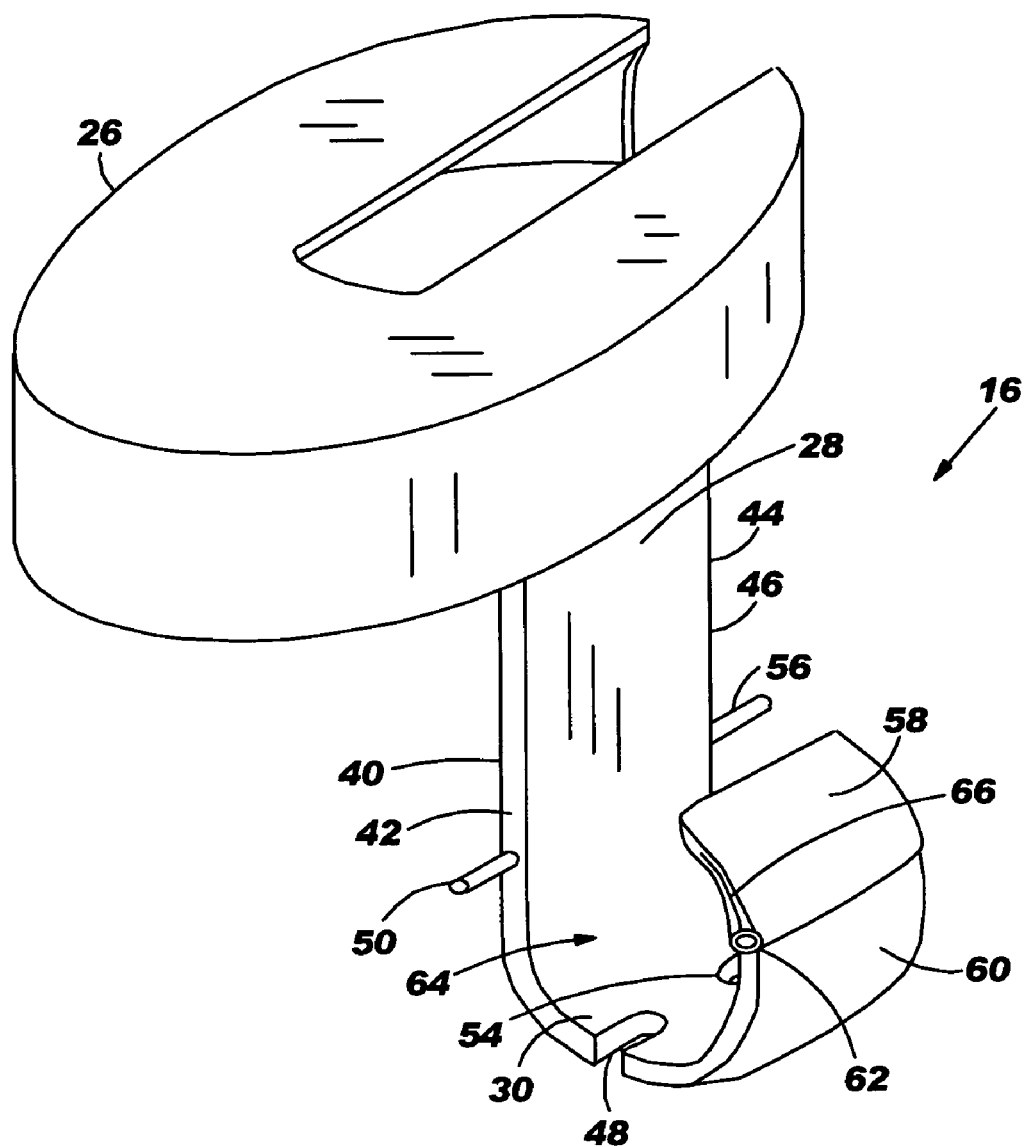
FIG. 3 is a partial, isometric view of a saddle according to the embodiments of this invention.

FIG. 3 is a partial, isometric view of the first saddle 16 according to the embodiments of this invention. The features shown in FIG. 3 may also be included in the second saddle (shown as reference numeral 22 in FIG. 2). The first saddle 16 downwardly extends from the crown 26. The stem 28 downwardly extends from the crown 26, and the generally semi-circular section 30 outwardly extends from the stem 28 and forms the first saddle 16. The saddle 16 has an outer edge 40, and a flange 42 is formed at the outer edge 40. An opposite outer edge 44 may, likewise, include an opposite flange 46. The flanges 42 and 46 stiffen the saddle 16 to help reduce deformation from the weight of the communications cable 12.

The saddle 16 may also include features for securing the communications cable 12. These features may include one or more notches 48 and/or one or more hooks 50. These notches 48 and/or hooks 50 help locate a plastic or metal tie that secures the communications cable 12 within the saddle 16. FIG. 3, for example, shows a pair of notches 48, 54 and a pair of hooks 50, 56. Each notch 48 and 54 inwardly extends from the respective outer edges 40, 44 of the saddle 16. Each hook 50 and 56 outwardly extends from the respective outer edges 40, 44 of the saddle 16. A plastic or metal tie (not shown for simplicity) may be looped around the saddle 16, around the communications cable 12, and through and within the pair of notches 48, 54. Another plastic or metal tie (again not shown for simplicity) may additionally or alternatively be looped around the saddle 16, around the communications cable 12, and around the pair of hooks 50, 56. The one or more notches 48 and/or the one or more hooks 50 locate the ties that secure the communications cable 12 within the saddle 16.

FIG. 3 also shows a gate 58. The semi-circular section 30 upwardly turns and terminates at an outer tip 60. The gate 58 is hinged about the outer tip 60 at a hinge 62. The hinged gate 58 provides access to an interior passage 64 of the saddle 16. A technician swings open the hinged gate 58 and inserts the communications cable 12 into the interior passage 64. This hinged gate 58 is especially useful when new communication cables are routed alongside, or in place of, previously installed communication cables. A spring 66 restores the hinged gate 58 to a closed position and helps retain the communication cables within the interior passage 64.

Figure 4:
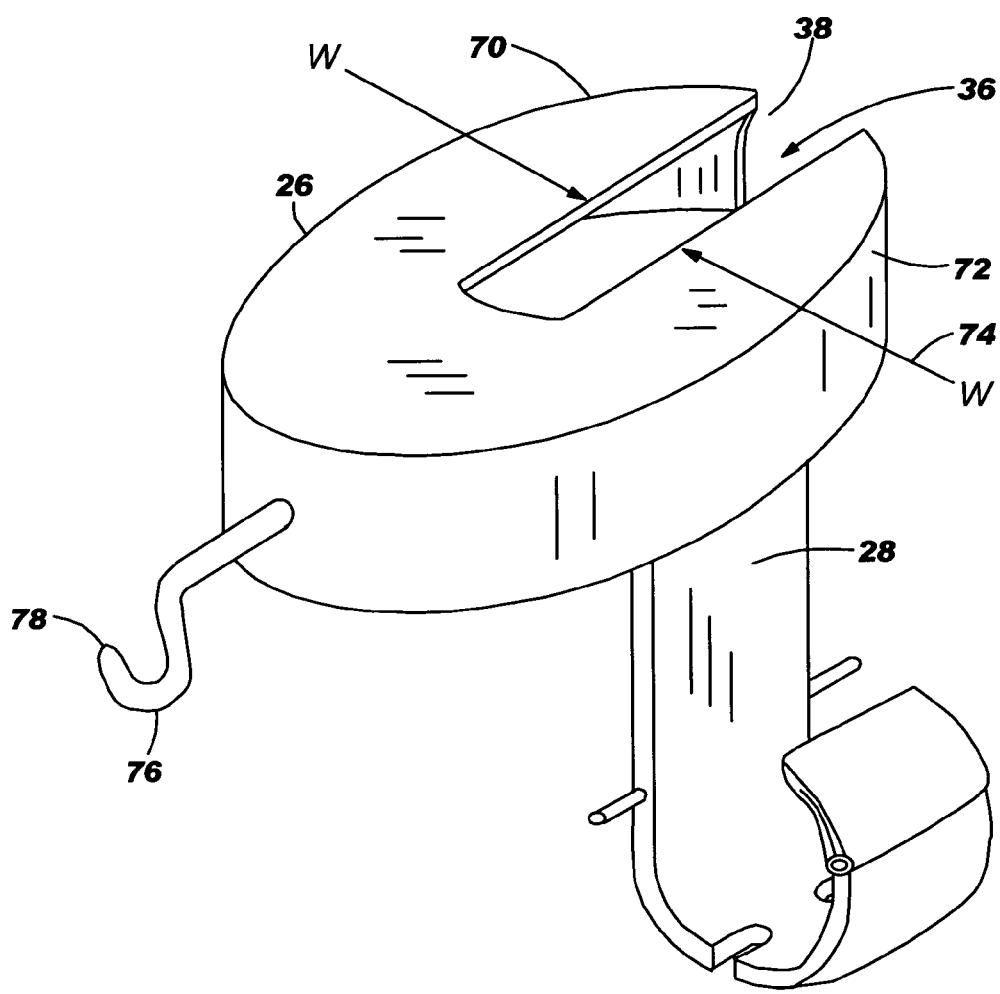
FIG. 4 is a partial, isometric view of a crown according to the embodiments of this invention.

FIG. 4 is a partial, isometric view of the crown 26 according to the embodiments of this invention. The crown 26 includes the slot 36 with the open end 38. The open end 38 of the slot 36 slides onto, within, or in between the adjoining links of the chain (shown, respectively, as reference numerals 18, 38, and 20 in FIG. 2). The slot 36 inwardly extends from an outer edge 70 of the crown 26. A skirt 72 downwardly extends from at least a portion of the outer edge 70 of the crown 26. The slot 36 has a width "w" (shown as reference numeral 74) less than a width of the adjoining links of the chain. Because the crown 26 slides onto the chain 20, the crown 26 can be positioned at any link of the chain 20. The crown 26 thus varies the height of the saddles 16 and 22 along the chain 20. The crown 26 thus helps maintain a desired routing of the communications cables 12 and 24.

The crown 26 may also include a chain hook 76. The chain hook 76 outwardly extends from the crown 26. The chain hook 76 has an outer tip 78. This outer tip 78 is sized to insert into and through an opening in a link of the chain (not shown for simplicity). If any excess chain dangles below the crown 26, the chain hook 76 allows the excess chain to be hung in a loop from the crown 26.

Figure 5A:
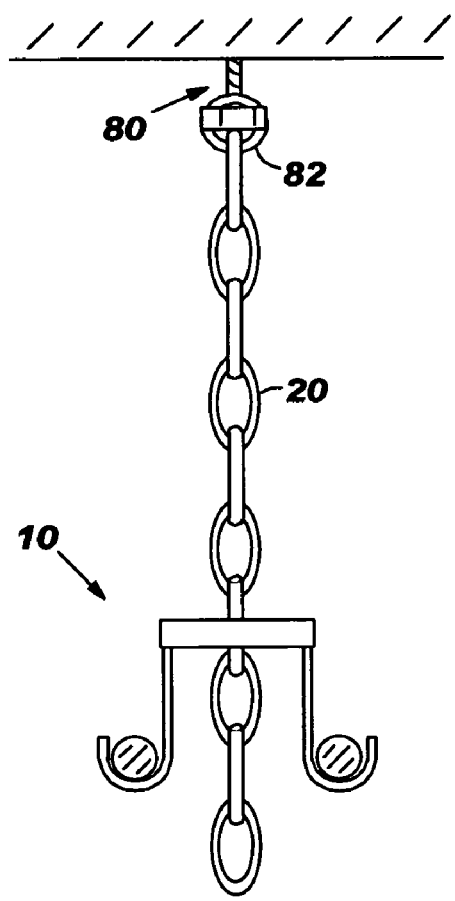
FIG. 5 is a schematic illustrating various means for supporting the apparatus.
Figure 5B:
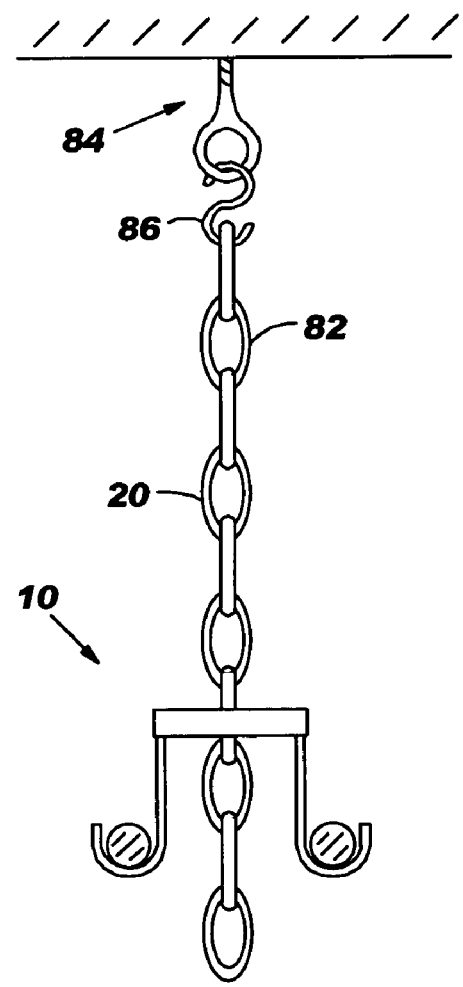

FIG. 5 is a schematic illustrating various means for supporting the apparatus 10. FIG. 5A shows the means for supporting the apparatus including a threaded fastener 80. The threaded fastener 80 inserts through a link 82 of the chain 20 and threads into a supporting surface (such as concrete, wood, drywall, or metal). FIG. 5B shows a threaded eyelet 84. The threaded eyelet 84 also threads into the supporting surface. An "S"-shaped hook 86 may interconnect the link 82 of the chain 20 to the threaded eyelet 84. The means for supporting the apparatus 10 may additionally or alternatively include a clip for clipping the apparatus to the supporting surface, a nail for nailing the apparatus to the supporting surface, and a suction device (such as a suction cup) for attaching the apparatus to the supporting surface. The means for supporting the apparatus 10 may additionally or alternatively include welds, adhesives, rivets, magnet, springs, hook and loop fabric fastener, and other chemical/mechanical fasteners.

While the present invention has been described with respect to various features, aspects, and embodiments, those skilled and unskilled in the art will recognize the invention is not so limited. Other variations, modifications, and alternative embodiments may be made without departing from the spirit and scope of the present invention.

What is claimed is:

1. An apparatus, comprising:
   a chain dangling from a means for supporting the apparatus; and
   a generally hook-shaped saddle for supporting a communications cable thereacross, the saddle comprising a crown, a stem downwardly extending from the crown, and a generally semi-circular section outwardly extending from the stem and forming the saddle;
   the crown including an open-ended slot for sliding onto a link of the chain and a chain hook outwardly extending from the crown, the chain hook having an outer tip sized to insert into and through an opening in another link of the chain, the chain hook for looping excess chain that dangles below the crown,
   wherein the crown can be positioned along the chain, thus varying the height of the saddle along the chain and helping maintain a desired routing of the communication cable.

2. An apparatus according to claim 1, further comprising a second generally hook-shaped saddle downwardly extending from the crown, the second generally hook-shaped saddle for supporting additional communications cable thereacross.

3. An apparatus according to claim 1, wherein the generally hook-shaped saddle includes a flange at an outer edge thereof, the flange stiffening the generally hook-shaped saddle.

4. An apparatus according to claim 1, wherein the saddle includes a gate hinged to an outer tip thereof, the gate providing access to the semi-circular section so that the communication cable may be securely inserted therethrough.

5. An apparatus according to claim 1, wherein the open-ended slot inwardly extends from an outer edge of the crown.

6. An apparatus according to claim 1, wherein the crown comprises a downwardly extending skirt.

7. An apparatus according to claim 1, wherein the saddle includes a notch, the notch inwardly extending from an outer edge of the saddle, the notch for locating a tie that secures the communications cable within the saddle.

8. An apparatus according to claim 1, wherein the saddle includes a pair of notches, a first notch inwardly extending from an outer edge of the saddle, a second notch inwardly extending from an opposite outer edge of the saddle, the pair of notches for locating a tie that secures the communications cable within the saddle.

9. An apparatus according to claim 1, wherein the saddle includes a hook, the hook outwardly extending from an outer edge of the saddle, the hook for locating a tie that secures the communications cable within the saddle.

10. An apparatus according to claim 1, wherein the saddle includes a pair of hooks, a first hook outwardly extending from an outer edge of the saddle, a second hook outwardly extending from an opposite outer edge of the saddle, the pair of hooks for locating a tie that secures the communications cable within the saddle.

11. An apparatus according to claim 1, wherein the means for supporting the apparatus comprises a threaded member for threading into a supporting surface.

12. An apparatus according to claim 1, wherein the means for supporting the apparatus comprises an "S"-shaped member for hooking onto a supporting surface.

13. An apparatus, comprising:
   a chain dangling from a means for supporting the apparatus; and
   a generally hook-shaped saddle for supporting a communications cable thereacross, the saddle comprising a crown, a stem downwardly extending from the crown, and a generally semi-circular section outwardly extending from the stem and forming the saddle;
   the crown including an open-ended slot for sliding onto a link of the chain and a downwardly extending skirt,
   wherein the crown can be positioned along the chain, thus varying the height of the saddle along the chain and helping maintain a desired routing of the communication cable.

14. An apparatus according to claim 13, further comprising a second generally hook-shaped saddle downwardly extending from the crown, the second generally hook-shaped saddle for supporting additional communications cable thereacross.

15. An apparatus according to claim 13, wherein the open-ended slot inwardly extends from an outer edge of the crown.

16. An apparatus according to claim 13, further comprising a notch inwardly extending from an outer edge of the saddle, the notch for locating a tie that secures the communications cable within the saddle.

17. An apparatus according to claim 13, wherein the open-ended slot inwardly extends from an outer edge of the crown.

* * * * *